United States Patent
Yonemura et al.

(10) Patent No.: US 12,180,848 B2
(45) Date of Patent: Dec. 31, 2024

(54) CENTRIFUGAL COMPRESSOR AND TURBOCHARGER

(71) Applicant: IHI Corporation, Tokyo (JP)

(72) Inventors: Atsushi Yonemura, Tokyo (JP); Ryota Sakisaka, Tokyo (JP); Yoichi Sato, Tokyo (JP); Taiki Kanzawa, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 18/502,135

(22) Filed: Nov. 6, 2023

(65) Prior Publication Data

US 2024/0084714 A1    Mar. 14, 2024

Related U.S. Application Data

(63) Continuation of application No. PCT/JP2022/028195, filed on Jul. 20, 2022.

(30) Foreign Application Priority Data

Aug. 12, 2021   (JP) .................. 2021-131605

(51) Int. Cl.
    *F01D 17/14*    (2006.01)
    *F01D 9/02*    (2006.01)

(52) U.S. Cl.
    CPC ............. *F01D 17/143* (2013.01); *F01D 9/02* (2013.01); *F01D 17/146* (2013.01); *F05D 2220/40* (2013.01); *F05D 2270/10* (2013.01)

(58) Field of Classification Search
    CPC ............................. F01D 17/143; F01D 17/146
    See application file for complete search history.

(56) References Cited

U.S. PATENT DOCUMENTS 10,677,153 B1    6/2020    Gautam et al.
2017/0191496 A1*    7/2017    Harley ................ F04D 27/0215
(Continued)

FOREIGN PATENT DOCUMENTS

CN    104454651 A    3/2015
JP    63-128298 U    8/1988
(Continued)

OTHER PUBLICATIONS

International Search Report issued Oct. 4, 2022 in PCT/JP2022/028195 filed on Jul. 20, 2022, 3 pages.

*Primary Examiner* — Michael L Sehn
(74) *Attorney, Agent, or Firm* — Oblon, McClelland, Maier & Neustadt, L.L.P.

(57) ABSTRACT

A centrifugal compressor includes: a housing including an intake flow path; a compressor impeller arranged in the intake flow path and including a plurality of blades; an accommodation chamber formed upstream of the blades in a flow of intake air in the housing; a movable member arranged in the accommodation chamber and movable to a protruding position where the movable member protrudes into the intake flow path and to a retracted position where the movable member is retracted from the intake flow path; a plurality of slits formed closer to the blades with respect to the accommodation chamber in the housing and connected to the intake flow path; a plurality of compartment walls circumferentially separating the plurality of slits; and an outer circumferential wall connecting radially outer ends of the plurality of compartment walls.

7 Claims, 14 Drawing Sheets

(56) References Cited

U.S. PATENT DOCUMENTS

| | | | |
|---|---|---|---|
| 2018/0094647 | A1 | 4/2018 | Puzik et al. |
| 2020/0011196 | A1* | 1/2020 | Karstadt ................... F16K 3/03 |
| 2020/0208651 | A1* | 7/2020 | Bogner ................ F01D 17/141 |
| 2021/0088054 | A1 | 3/2021 | Sakisaka et al. |

FOREIGN PATENT DOCUMENTS

| | | |
|---|---|---|
| JP | 4-17198 U | 2/1992 |
| JP | 2009-236035 A | 10/2009 |
| JP | 2012-87709 A | 5/2012 |
| JP | 2014-109214 A | 6/2014 |
| JP | 2017-535710 A | 11/2017 |
| JP | 2018-513302 A | 5/2018 |
| JP | 2020-66993 A | 4/2020 |
| WO | WO 2020/031507 A1 | 2/2020 |

* cited by examiner

CENTRIFUGAL COMPRESSOR AND TURBOCHARGER

CROSS REFERENCE TO RELATED APPLICATIONS

This application is a continuation application of International Application No. PCT/JP2022/028195, filed on Jul. 20, 2022, which claims priority to Japanese Patent Application No. 2021-131605 filed on Aug. 12, 2021, the entire contents of which are incorporated herein by reference.

BACKGROUND ART

Technical Field

The present disclosure relates to a centrifugal compressor and a turbocharger.

A centrifugal compressor includes a compressor housing in which an intake flow path is formed. A compressor impeller is arranged in the intake flow path. When a flow rate of air flowing into the compressor impeller decreases, air compressed by the compressor impeller flows backward in the intake flow path, a phenomenon known as surging.

Patent Literature 1 discloses a centrifugal compressor comprising a throttling mechanism in a compressor housing. The throttling mechanism includes a movable member. The movable member is configured to be movable to a protruding position where the movable member protrudes into an intake flow path and to a retracted position where the movable member is retracted from the intake flow path. The throttling mechanism reduces a cross-sectional area of the intake flow path by causing the movable member to protrude into the intake flow path. When the movable member protrudes into the intake flow path, air flowing backward in the intake flow path is blocked by the movable member. By blocking the air flowing backward in the intake flow path, surging is curbed.

CITATION LIST

Patent Literature

Patent Literature 1: U.S. Ser. No. 10/677,153 B

SUMMARY

Technical Problem

The air flowing backward in the intake flow path includes a swirl component caused by the rotation of the compressor impeller. When the air flowing backward in the intake flow path is blocked by the movable member as described in Patent Literature 1, the swirl component of the air flowing backward disturbs a flow around leading edges of the compressor impeller, which may generate noise that may be considered as aerodynamic noise.

The purpose of the present disclosure is to provide a centrifugal compressor and a turbocharger that can reduce noise.

Solution to Problem

In order to solve the above problem, a centrifugal compressor according to one aspect of the present disclosure includes: a housing including an intake flow path; a compressor impeller arranged in the intake flow path and including a plurality of blades; an accommodation chamber formed upstream of the blades in a flow of intake air in the housing; a movable member arranged in the accommodation chamber and movable to a protruding position where the movable member protrudes into the intake flow path and to a retracted position where the movable member is retracted from the intake flow path; a plurality of slits formed closer to the blades with respect to the accommodation chamber in the housing and connected to the intake flow path; a plurality of compartment walls circumferentially separating the plurality of slits; and an outer circumferential wall connecting radially outer ends of the plurality of compartment walls.

The plurality of compartment walls may be arranged closer to the accommodation chamber with respect to leading edges of the blades.

The plurality of compartment walls may be inclined in a rotational direction of the compressor impeller.

An inclination angle of the plurality of compartment walls may be in a range of 20° to 70° or −20° to −70° with respect to a radial direction of the compressor impeller.

In order to solve the above problem, a turbocharger according to the present disclosure includes the above described centrifugal compressor.

Effects of Disclosure

According to the present disclosure, noise can be reduced.

DESCRIPTION OF EMBODIMENTS

Embodiments of the present disclosure will be described in detail below with reference to the accompanying drawings. Specific dimensions, materials, and numerical values described in the embodiments are merely examples for a better understanding, and do not limit the present disclosure unless otherwise specified. In this specification and the drawings, duplicate explanations are omitted for elements having substantially the same functions and configurations by assigning the same reference sign. Furthermore, elements not directly related to the present disclosure are omitted from the figures.

First Embodiment

Figure 1:
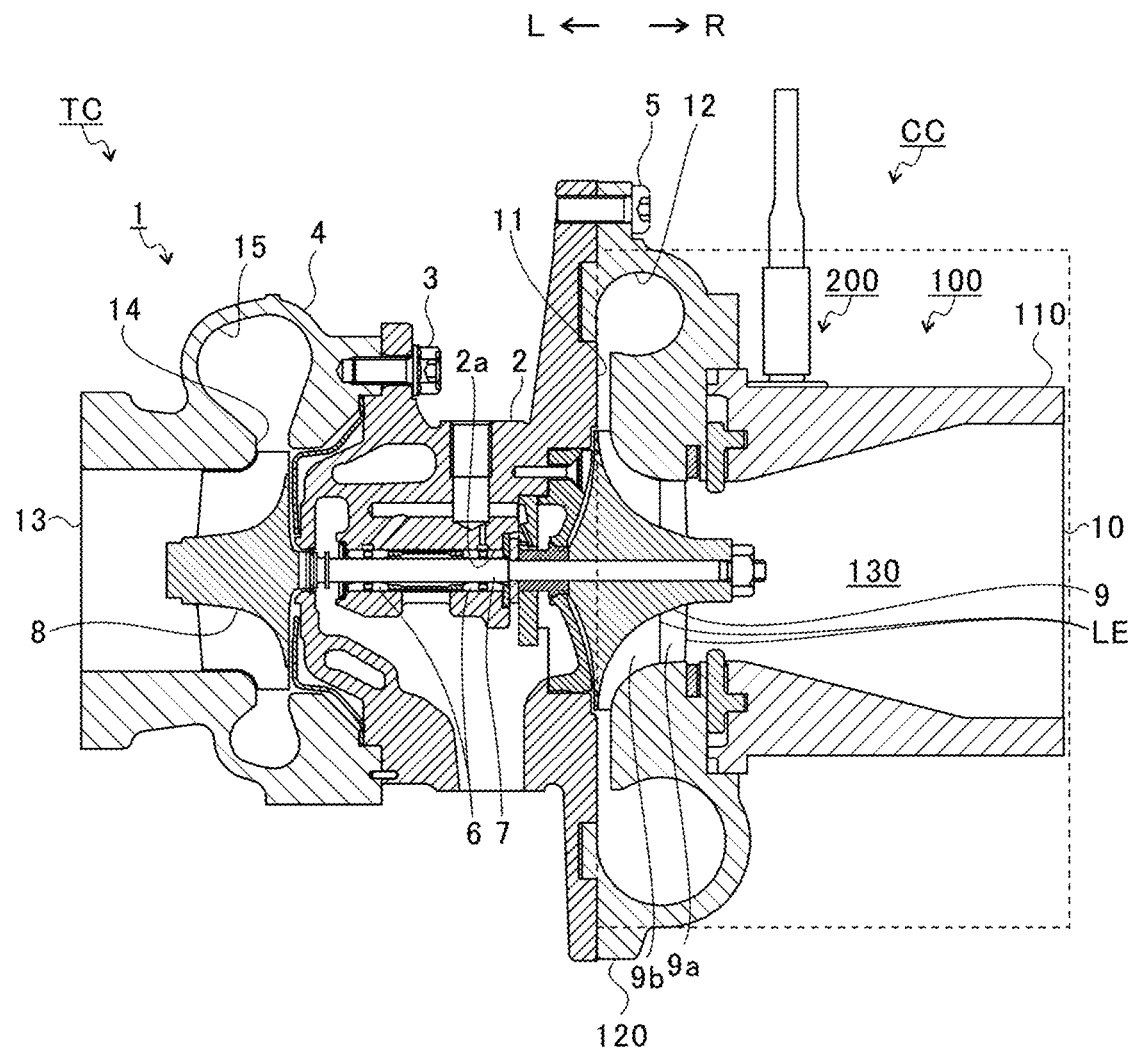
FIG. 1 is a schematic cross-sectional view of a turbocharger according to the first embodiment.

FIG. 1 is a schematic cross-sectional view of a turbocharger TC according to the first embodiment. A direction indicated by arrow L in FIG. 1 is described as the left side of the turbocharger TC. A direction indicated by arrow R in FIG. 1 is described as the right side of the turbocharger TC. In the turbocharger TC, a part including a compressor housing 100 (described later) functions as a centrifugal compressor CC. Hereinafter, the centrifugal compressor CC is described as being driven by a turbine impeller 8 (described later). However, the centrifugal compressor CC is not limited thereto, and may be driven by an engine (not shown) or by an electric motor (motor, not shown). As such, the centrifugal compressor CC may be incorporated into a device other than the turbocharger TC, or may be a stand-alone unit.

As shown in FIG. 1, the turbocharger TC comprises a turbocharger body 1. The turbocharger body 1 includes a bearing housing 2, a turbine housing 4, a compressor housing (housing) 100, and a link mechanism 200. Details of the link mechanism 200 will be described later. The turbine housing 4 is connected to the left side of the bearing housing 2 by fastening bolts 3. The compressor housing 100 is connected to the right side of the bearing housing 2 by fastening bolts 5.

An accommodation hole 2a is formed in the bearing housing 2. The accommodation hole 2a passes through the bearing housing 2 in the left-to-right direction of the turbocharger TC. A bearing 6 is arranged in the accommodation hole 2a. In FIG. 1, a full floating bearing is shown as an example of the bearing 6. However, the bearing 6 may be any other radial bearing, such as a semi-floating bearing or a rolling bearing. A part of a shaft 7 is arranged in the accommodation hole 2a. The shaft 7 is rotatably supported by the bearing 6. A turbine impeller 8 is provided at a left end of the shaft 7. The turbine impeller 8 is rotatably housed in the turbine housing 4. A compressor impeller 9 is provided at a right end of shaft 7. The compressor impeller 9 is rotatably housed in the compressor housing 100. In the present disclosure, a rotational axis direction, a radial direction, and a circumferential direction of the shaft 7, the turbine impeller 8, and the compressor impeller 9 may simply be referred to as the rotational axis direction, the radial direction, and the circumferential direction, respectively. The compressor impeller 9 includes a plurality of long blades 9a and a plurality of short blades 9b formed on an outer circumference surface of a hub. The plurality of long blades 9a and short blades 9b are formed alternately spaced apart from each other in the circumferential direction. The plurality of long blades 9a and short blades 9b are formed at equal intervals in the circumferential direction. A leading edge LE of the long blade 9a is positioned spaced apart from the bearing housing 2 with respect to a leading edge LE of the short blade 9b. In other words, the leading edge LE of the short blade 9b is positioned closer to the bearing housing 2 with respect to the leading edge LE of the long blade 9a. In the present embodiment, the compressor impeller 9 includes the long blades 9a and the short blades 9b. However, the compressor impeller 9 is not limited thereto, and may include only one of the long blades 9a and the short blades 9b.

An inlet 10 is formed in the compressor housing 100. The inlet 10 opens to the right side of the turbocharger TC. The inlet 10 is connected to an air cleaner (not shown). A diffuser flow path 11 is formed between the bearing housing 2 and the compressor housing 100. The diffuser flow path 11 pressurizes air. The diffuser flow path 11 is formed in an annular shape from a radially inner side to an outer side. The diffuser flow path 11 is connected to the intake flow path 10 via the compressor impeller 9 at a radially inner part.

A compressor scroll flow path 12 is formed in the compressor housing 100. For example, the compressor scroll flow path 12 is located radially outside the compressor impeller 9. The compressor scroll flow path 12 is connected to an intake port of an engine (not shown) and the diffuser flow path 11. As the compressor impeller 9 rotates, air is sucked into the compressor housing 100 from the inlet 10. The sucked air is pressurized and accelerated while passing through the blades of the compressor impeller 9. The pressurized and accelerated air is further pressurized in the diffuser flow path 11 and the compressor scroll flow path 12. The pressurized air flows out from an outlet (not shown) and is directed to the intake port of the engine.

As such, the turbocharger TC comprises the centrifugal compressor (compressor) CC that pressurizes fluid with using centrifugal force. The centrifugal compressor CC includes the compressor housing 100, the compressor impeller 9, and the link mechanism 200 described later.

An outlet 13 is formed in the turbine housing 4. The outlet 13 opens to the left side of the turbocharger TC. The outlet 13 is connected to an exhaust gas purifier (not shown). A connecting flow path 14 and a turbine scroll flow path 15 are formed in the turbine housing 4. The turbine scroll flow path 15 is located radially outside the turbine impeller 8. The connecting flow path 14 is located between the turbine impeller 8 and the turbine scroll flow path 15.

The turbine scroll flow path 15 is connected to a gas inlet (not shown). Exhaust gas discharged from an exhaust manifold of the engine (not shown) is directed to the gas inlet. The connecting flow path 14 connects the turbine scroll flow path 15 to the outlet 13. The exhaust gas directed from the gas inlet to the turbine scroll flow path 15 is directed to the outlet 13 through the connecting flow path 14 and blades of the turbine impeller 8. The exhaust gas rotates the turbine impeller 8 when passing therethrough.

A rotational force of the turbine impeller 8 is transmitted to the compressor impeller 9 via the shaft 7. As described above, air is pressurized by the rotational force of the compressor impeller 9 and directed to the intake port of the engine.

Figure 2:
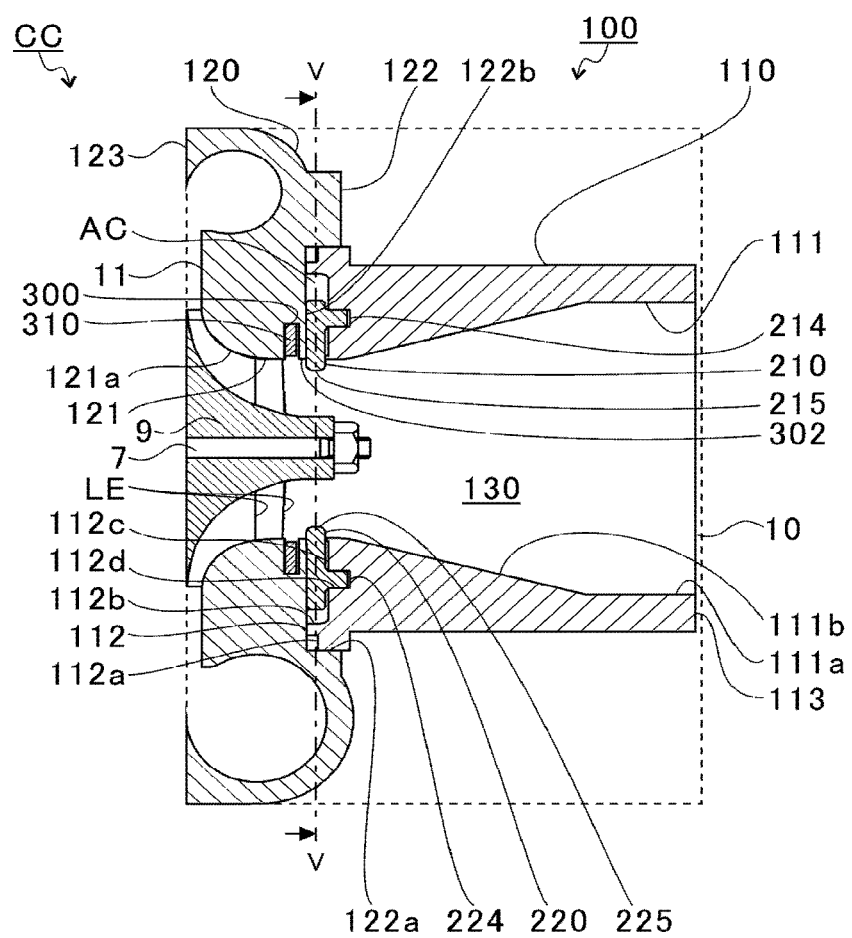
FIG. 2 is an extracted view of a part enclosed by dashed lines in FIG. 1.

FIG. 2 is an extracted view of a part enclosed by dashed lines in FIG. 1. As shown in FIG. 2, the compressor housing 100 includes a first housing member 110 and a second housing member 120. The first housing member 110 is located on the right side (a side spaced apart from the bearing housing 2) in FIG. 2 with respect to the second housing member 120. The second housing member 120 is connected to the bearing housing 2. The first housing member 110 is connected to the second housing member 120 in the rotational axis direction.

The first housing member 110 has a substantially cylindrical shape. A through hole 111 is formed in the first housing member 110. The first housing member 110 includes an end face 112 on a side adjacent (connected) to the second housing member 120. The first housing member 110 also includes an end face 113 on a side spaced apart from the second housing member 120. The inlet 10 is formed on the end face 113. The through hole 111 extends from the end face 112 to the end face 113 (inlet 10) along the rotational axis direction. In other words, the through hole 111 passes through the first housing member 110 in the rotational axis direction. The through hole 111 includes the inlet 10 on the end face 113.

The through hole 111 includes a parallel portion 111a and a tapered portion 111b. The parallel portion 111a is located closer to the end face 113 with respect to the tapered portion 111b. An inner diameter of the parallel portion 111a is substantially constant over the rotational axis direction. The tapered portion 111b is located closer to the end face 112 with respect to the parallel portion 111a. The tapered portion 111b is continuous with the parallel portion 111a. An inner diameter at the continuous part of the tapered portion 111b is substantially equal to the inner diameter of the parallel portion 111a. The inner diameter of the tapered portion 111b decreases as it is spaced apart from the parallel portion 111a (as approaching the end face 112).

A notch 112a is formed on the end face 112. The notch 112a is recessed from the end face 112 toward the end face 113. The notch 112a is formed at an outer periphery of the end face 112. For example, the notch 112a has a substantially annular shape when seen from the rotational axis direction.

An accommodation chamber AC is formed on the end face 112. The accommodation chamber AC is formed in the first housing member 110 so as to be closer to the inlet 10 with respect to the leading edge LE of the long blade 9a of the compressor impeller 9. The accommodation chamber AC includes an accommodation groove 112b, bearing holes 112d, and an accommodation hole 115 (see FIG. 4), which will be described later.

The accommodation groove 112b is formed on the end face 112. The accommodation groove 112b is located between the notch 112a and the through hole 111. The accommodation groove 112b is recessed from the end face 112 toward the end face 113. For example, the accommodation groove 112b has a substantially annular shape when seen from the rotational axis direction. The accommodation groove 112b is connected to the through hole 111 at a radially inner part.

The bearing holes 112d are formed on a wall surface 112c on a side of the end face 113 in the accommodation groove 112b. The bearing holes 112d extend from the wall surface 112c toward the end face 113 in the rotational axis direction. Two bearing holes 112d are provided so as to be spaced apart from each other in the rotational direction. The two bearing holes 112d are arranged spaced apart from each other by 180 degrees in the rotational direction.

A through hole 121 is formed in the second housing member 120. The second housing member 120 includes an end face 122 on a side adjacent (connected) to the first housing member 110. Furthermore, the second housing member 120 includes an end face 123 on a side spaced apart from the first housing member 110 (side connected to the bearing housing 2). The through hole 121 extends from the end face 122 to the end face 123 along the rotational axis direction. In other words, the through hole 121 passes through the second housing member 120 in the rotational axis direction.

A recess 300 that is recessed radially outward is formed at the through hole 121. The recess 300 does not pass through the second housing member 120 in the radial direction, and is configured as a non-through groove. A radially inner part of the recess 300 is connected to the intake flow path 130. The recess 300 is formed closer to the blades 9a and 9b of the compressor impeller 9 with respect to the accommodation chamber AC. A ring 310 is arranged in the recess 300.

A width of the ring 310 in the rotational axis direction is substantially equal to a width of the recess 300 in the rotational axis direction. However, the width of the ring 310 in the rotational axis direction is not limited thereto, and may be smaller than the width of the recess 300 in the rotational axis direction. For example, the width of the ring 310 in the rotational axis direction may be half the width of the recess 300 in the rotational axis direction. This facilitates assembly of the ring 310 into the recess 300 and improves the assembly of the centrifugal compressor CC.

The recess 300 is formed closer to the accommodation chamber AC with respect to the leading edges LE of the long blade 9a and the short blade 9b of the compressor impeller 9. Specifically, the recess 300 is formed between the leading edge LE of the long blade 9a and the accommodation chamber AC. However, the recess 300 is not limited thereto, and may be arranged opposite to the accommodation chamber AC with respect to the leading edge LE of the long blade 9a. For example, the recess 300 may be arranged between the leading edge LE of the long blade 9a and the leading edge LE of the short blade 9b, or may be arranged closer to the bearing housing 2 with respect to the leading edge LE of the short blade 9b. Furthermore, the recess 300 may be arranged in a position radially facing the leading edge LE of the long blade 9a, or may be arranged in a position radially facing the leading edge LE of the short blade 9b.

A partition 302 is provided between the recess 300 and the accommodation chamber AC. In other words, the recess 300 and the accommodation chamber AC are separated from each other in the rotational axis direction. However, the recess 300 and the accommodation chamber AC are not limited thereto, and may be adjacent to each other in the rotational axis direction and connected to each other.

Figure 3:
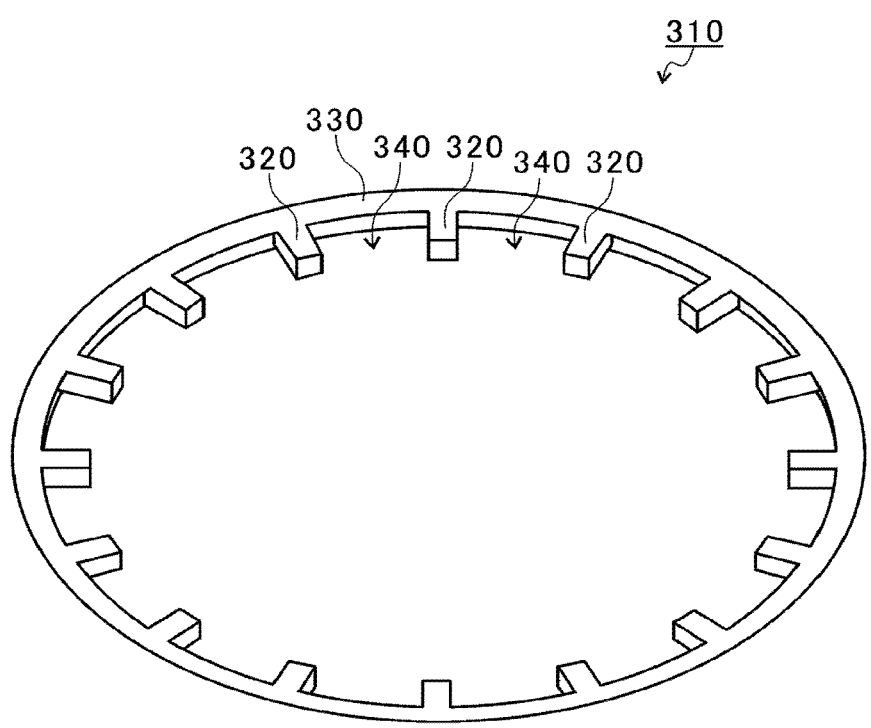
FIG. 3 is a schematic perspective view of an ring according to the first embodiment.

FIG. 3 is a schematic perspective view of the ring 310 according to the first embodiment. As shown in FIG. 3, the ring 310 includes a plurality of compartment walls 320 and an outer circumferential wall 330. The plurality of compartment walls 320 are spaced apart from each other at equal intervals in the circumferential direction. However, the plurality of compartment walls 320 are not limited thereto, and may be spaced apart from each other at unequal intervals in the circumferential direction.

The plurality of compartment walls 320 extend radially inward from the outer circumferential wall 330. The plurality of compartment walls 320 circumferentially divide a space within the recess 300. As such, a plurality of slits 340 extending in the radial direction are formed between the plurality of compartment walls 320. The plurality of compartment walls 320 circumferentially separate the plurality of slits 340.

A circumferential width of the compartment wall 320 is constant over the radial direction. However, the circumferential width of the compartment wall 320 is not limited thereto, and may vary in the radial direction. For example, the circumferential width of the compartment wall 320 may gradually decrease as moving inward in the radial direction. However, the circumferential width of the compartment wall 320 is not limited thereto, and may gradually increase as moving inward in the radial direction.

The outer circumferential wall 330 connects radially outer ends of the plurality of compartment walls 320. As such, radially outer parts of the plurality of slits 340 are defined by the outer circumferential wall 330. Thus, the plurality of slits 340 are separated by the plurality of compartment walls 320 in the circumferential direction, and defined by the outer circumferential wall 330 in the radially outer parts. Radially inner parts of the plurality of slits 340 are connected to the intake flow path 130.

Returning to FIG. 2, an inner diameter of the through hole 121 at an end closer to the end face 122 is substantially equal to the inner diameter of the through hole 111 at an end closer to the end face 112. In other words, an inner diameter of the partition 302 is substantially equal to the inner diameter of the through hole 111 at the end closer to the end face 112. A shroud portion 121a is formed on an inner wall of the through hole 121. The shroud portion 121a faces the blades 9a and 9b of the compressor impeller 9 from a radially outer side. An outer diameter of the compressor impeller 9 increases as it is spaced apart from the leading edge LE of the long blade 9a of the compressor impeller 9 in the rotational axis direction. An inner diameter of the shroud portion 121a increases as it is spaced apart from the end face 122 (as approaching the end face 123).

An accommodation groove 122a is formed in the end face 122. The accommodation groove 122a is recessed from the end face 122 toward the end face 123. For example, the accommodation groove 122a has a substantially annular shape when seen from the rotational axis direction. The first housing member 110 is inserted into the accommodation groove 122a. The end face 112 of the first housing member 110 contacts a wall surface 122b parallel to the end face 123 in the accommodation groove 122a. The accommodation chamber AC is formed between the first housing member 110 (wall surface 112c) and the second housing member 120 (wall surface 122b).

The through hole 111 of the first housing member 110 and the through hole 121 of the second housing member 120 form an intake flow path 130. As such, the intake flow path 130 is formed in the compressor housing 100. The intake flow path 130 extends from the air cleaner (not shown) to the diffuser flow path 11 via the inlet 10. A side closer to the air cleaner (inlet 10) of the intake flow path 130 is referred to as an upstream side in a flow of intake air, and a side closer to the diffuser flow path 11 of the intake flow path 130 is referred to as a downstream side in the flow of the intake air.

The compressor impeller 9 is arranged in the intake flow path 130. The cross-sectional shape of the intake flow path 130 (through holes 111 and 121) perpendicular to the rotational axis direction is, for example, circular around the rotational axis of the compressor impeller 9. However, the cross-sectional shape of the intake flow path 130 is not limited thereto, and may be, for example, elliptical.

A seal (not shown) is arranged in the notch 112a of the first housing member 110. The seal reduces a flow rate of air flowing in a gap between the first housing member 110 and the second housing member 120. However, the notch 112a and the seal are not essential.

Figure 4:
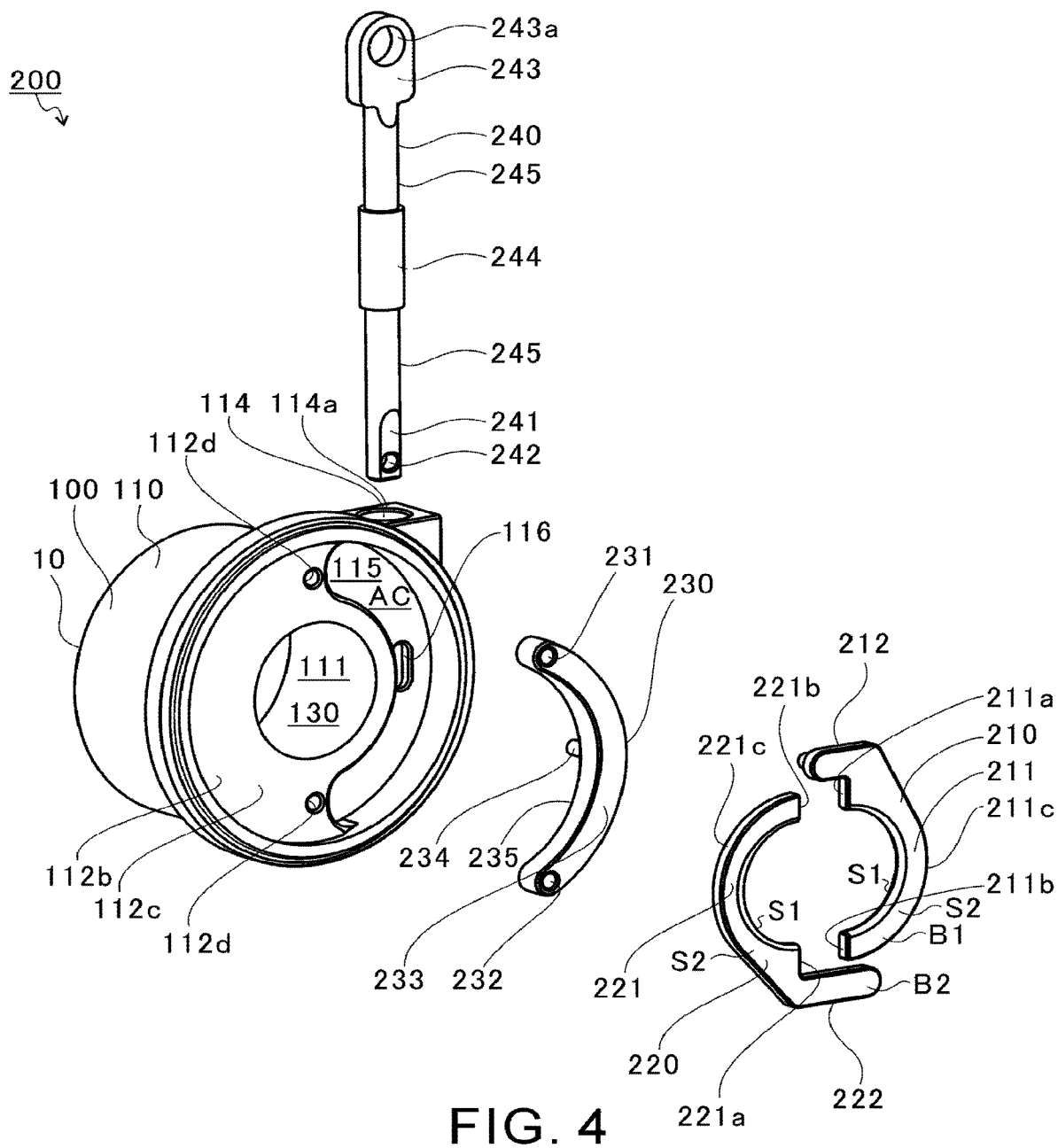
FIG. 4 is an exploded perspective view of components included in a link mechanism.

FIG. 4 is an exploded perspective view of components included in the link mechanism 200. In FIG. 4, only the first housing member 110 of the compressor housing 100 is shown. As shown in FIG. 4, the link mechanism 200 includes the first housing member 110, a first movable member 210, a second movable member 220, a connecting member 230, and a rod 240. Hereinafter, the first movable member 210 and the second movable member 220 are also collectively referred to as movable members 210 and 220. The link mechanism 200 is arranged closer to the inlet 10 (upstream side) of the intake flow path 130 with respect to the long blade 9a of the compressor impeller 9 in the rotational axis direction.

The first movable member 210 is arranged in the accommodation groove 112b (accommodation chamber AC). Specifically, the first movable member 210 is arranged between the wall surface 112c of the accommodation groove 112b and the wall surface 122b of the accommodation groove 122a (see FIG. 2) in the rotational axis direction. The first movable member 210 includes an opposing surface S1 facing the wall surface 112c of the accommodation groove 112b, and an opposing surface S2 facing the wall surface 122b of the accommodation groove 122a. The first movable member 210 includes a body B1. The body B1 includes a curved portion 211 and an arm 212.

The curved portion 211 extends in the circumferential direction. The curved portion 211 has a substantially semi-arc shape. One end face 211a and the other end face 211b of the curved portion 211 in the circumferential direction extend parallel to the radial direction and the rotational axis direction. However, the one end face 211a and the other end face 211b may be inclined with respect to the radial direction and the rotational axis direction.

The arm 212 is provided on the one end face 211a of the curved portion 211. The arm 212 extends radially outward from an outer circumferential surface 211c of the curved portion 211. Furthermore, the arm 212 extends in a direction inclined with respect to the radial direction (toward the second movable member 220).

The second movable member 220 is arranged in the accommodation groove 112b (accommodation chamber AC). Specifically, the second movable member 220 is arranged between the wall surface 112c of the accommodation groove 112b and the wall surface 122b of the accommodation groove 122a (see FIG. 2) in the rotational axis direction. The second movable member 220 includes an opposing surface S1 facing the wall surface 112c of the accommodation groove 112b and an opposing surface S2 facing the wall surface 122b of the accommodation groove 122a. The second movable member 220 includes a body B2. The body B2 includes a curved portion 221 and an arm 222.

The curved portion 221 extends in the circumferential direction. The curved portion 221 has a substantially semi-arc shape. One end face 221a and the other end face 221b of the curved portion 221 in the circumferential direction extend parallel to the radial direction and the rotational axis direction. However, the one end face 221a and the other end face 221b may be inclined with respect to the radial direction and the rotational axis direction.

The arm 222 is provided on the one end face 221a of the curved portion 221. The arm 222 extends radially outward from an outer circumferential surface 221c of the curved portion 221. Furthermore, the arm 222 extends in a direction inclined with respect to the radial direction (toward the first movable member 210).

The curved portion 211 faces the curved portion 221 across the center of rotation of the compressor impeller 9 (intake flow path 130). The one end face 211a of the curved portion 211 circumferentially faces the other end face 221b of the curved portion 221. The other end face 211b of the curved portion 211 circumferentially faces the one end face 221a of the curved portion 221. The first movable member 210 and the second movable member 220 are configured so that the curved portions 211 and 221 are movable in the radial direction, as described later in detail.

The connecting member 230 connects with the first movable member 210 and the second movable member 220. The connecting member 230 is located closer to the inlet 10 with respect to the first movable member 210 and the second movable member 220. The connecting member 230 has a substantially arc shape. A first bearing hole 231 is formed at one end and a second bearing hole 232 is formed at the other end of the connecting member 230 in the circumferential direction. In the connecting member 230, the first bearing hole 231 and the second bearing hole 232 are opened on an end face 233 closer to the first movable member 210 and the second movable member 220. The first bearing hole 231 and the second bearing hole 232 extend in the rotational axis direction. In the present embodiment, the first bearing hole 231 and the second bearing hole 232 are non-through holes. However, the first bearing hole 231 and the second bearing hole 232 may pass through the connecting member 230 in the rotational axis direction.

A rod connector 234 is formed on the connecting member 230 between the first bearing hole 231 and the second bearing hole 232. In the connecting member 230, the rod connector 234 is formed on an end face 235 opposite to the first movable member 210 and the second movable member 220. The rod connector 234 protrudes from the end face 235 in the rotational axis direction. The rod connector 234 has, for example, a substantially cylindrical shape.

The rod 240 has a substantially cylindrical shape. A flat portion 241 is formed at one end of the rod 240, and a connecting portion 243 is formed at the other end. The flat portion 241 extends in a plane direction that is substantially perpendicular to the rotational axis direction. A bearing hole 242 is opened on the flat portion 241. The bearing hole 242 extends in the rotational axis direction. The connecting portion 243 includes a connecting hole 243a. The connecting portion 243 (connecting hole 243a) is connected to an actuator described later. The bearing hole 242 may be, for example, an elongated hole whose length in the direction perpendicular to the rotational axis direction and an axis direction of the rod 240 (left-to-right direction in FIG. 6, described below) is longer than a length in the axis direction of the rod 240.

A rod large diameter portion 244 and two rod small diameter portions 245 are formed between the flat portion 241 and the connecting portion 243 in the rod 240. The rod large diameter portion 244 is located between the two rod small diameter portions 245. Between the two rod small diameter portions 245, the rod small diameter portion 245 closer to the flat portion 241 connects the rod large diameter portion 244 to the flat portion 241. Between the two rod small diameter portions 245, the rod small diameter portion 245 closer to the connection portion 243 connects the rod large diameter portion 244 to the connecting portion 243. An outer diameter of the rod large diameter portion 244 is larger than outer diameters of the two rod small diameter portions 245.

An insertion hole 114 is formed in the first housing member 110. One end 114a of the insertion hole 114 opens to the outside of the first housing member 110. The insertion hole 114 extends, for example, in a plane direction perpendicular to the rotational axis direction. The insertion hole 114 is located radially outside the through hole 111 (intake flow path 130). The flat portion 241 of the rod 240 is inserted into the insertion hole 114. The rod large diameter portion 244 is guided by an inner wall of the insertion hole 114. The rod 240 is prevented from moving except in the central axis direction of the insertion hole 114 (the central axis direction of the rod 240).

An accommodation hole 115 is formed in the first housing member 110. The accommodation hole 115 is opened on the wall surface 112c of the accommodation groove 112b. The accommodation hole 115 is recessed from the wall surface 112c toward the inlet 10. The accommodation hole 115 is located spaced apart from the inlet 10 (closer to the second housing member 120) with respect to the insertion hole 114. The accommodation hole 115 has a substantially arc shape when seen from the rotational axis direction. The accommodation hole 115 extends longer than the connecting member 230 in the circumferential direction. The accommodation hole 115 is circumferentially spaced apart from the bearing holes 112d.

A communication hole 116 is formed in the first housing member 110. The communication hole 116 connects the insertion hole 114 to the accommodation hole 115. The communication hole 116 is formed substantially in the middle of the accommodation hole 115 in the circumferential direction. The communication hole 116 is, for example, an elongated hole extending substantially parallel to the extending direction of the insertion hole 114. In the communication hole 116, a width in the longitudinal direction (extending direction) is greater than a width in the lateral direction (direction perpendicular to the extending direction). The width of the communication hole 116 in the lateral direction is greater than an outer diameter of the rod connector 234 of the connecting member 230.

The connecting member 230 is accommodated in the accommodation hole 115 (accommodation chamber AC). As such, the first movable member 210, the second movable member 220, and the connecting member 230 are arranged in the accommodation chamber AC formed in the first housing member 110. The accommodation hole 115 is circumferentially longer and radially larger than the connecting member 230. Accordingly, the connecting member 230 is allowed to move within the accommodation hole 115 in the plane direction perpendicular to the rotational axis direction.

The rod connector 234 is inserted through the communication hole 116 into the insertion hole 114. The flat portion 241 of the rod 240 is inserted into the insertion hole 114. The bearing hole 242 of the flat portion 241 faces the communication hole 116. The rod connector 234 is inserted into (connected to) the bearing hole 242. The rod connector 234 is supported by the bearing hole 242.

Figure 5:
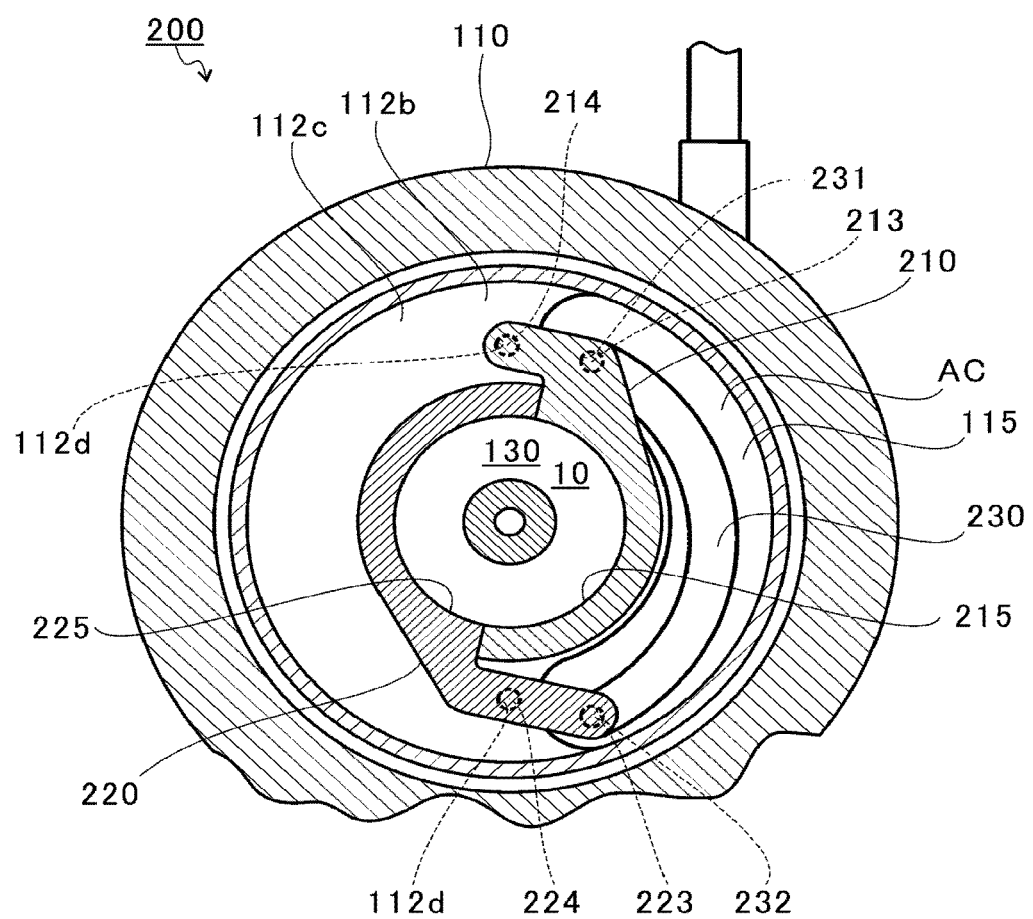
FIG. 5 is a cross-sectional view taken along line IV-IV in FIG. 2.

FIG. 5 is a cross-sectional view taken along line V-V in FIG. 2. As shown in dashed lines in FIG. 5, the first movable member 210 includes a connecting shaft 213 and a rotational shaft 214. In the first movable member 210, the connecting shaft 213 and the rotational shaft 214 protrude in the rotational axis direction from the opposing surface S1 (see FIG. 2) that faces the wall surface 112c. The connecting shaft 213 and the rotational shaft 214 extend toward the back side of the paper in FIG. 5. The rotational shaft 214 extends parallel to the connecting shaft 213. The connecting shaft 213 and rotational shaft 214 have a substantially cylindrical shape.

An outer diameter of the connecting shaft 213 is smaller than an inner diameter of the first bearing hole 231 of the connecting member 230. The connecting shaft 213 is inserted into the first bearing hole 231. The connecting shaft 213 is rotatably supported by the first bearing hole 231. An outer diameter of the rotational shaft 214 is smaller than an inner diameter of the bearing hole 112d of the first housing member 110. The rotational shaft 214 is inserted into the bearing hole 112d on the vertically upper side (closer to the rod 240) of the two bearing holes 112d. The rotational shaft 214 is rotatably supported by the bearing hole 112d. The rotational shaft 214 connects the first movable member 210 to the wall surface 112c that faces the first movable member 210 in the rotational axis direction.

The second movable member 220 includes a connecting shaft 223 and a rotational shaft 224. In the second movable member 220, the connecting shaft 223 and the rotational shaft 224 protrude in the rotational axis direction from the opposing surface S1 (see FIG. 2) that faces the wall surface 112c. The connecting shaft 223 and the rotational shaft 224 extend toward the back side of the paper in FIG. 4. The rotational shaft 224 extends parallel to the connecting shaft 223. The connecting shaft 223 and the rotational shaft 224 have a substantially cylindrical shape.

An outer diameter of the connecting shaft 223 is smaller than an inner diameter of the second bearing hole 232 of the connecting member 230. The connecting shaft 223 is inserted into the second bearing hole 232. The connecting shaft 223 is rotatably supported by the second bearing hole 232. An outer diameter of the rotational shaft 224 is smaller than an inner diameter of the bearing hole 112d of the first housing member 110. The rotational shaft 224 is inserted into the bearing hole 112d on the vertically lower side (spaced apart from the rod 240) of the two bearing holes 112d. The rotational shaft 224 is rotatably supported by the bearing hole 112d. The rotational shaft 224 connects the second movable member 220 to the wall surface 112c that faces the second movable member 220 in the rotational axis direction.

As described above, the link mechanism 200 includes a four-bar linkage. The four links (nodes) are the first movable member 210, the second movable member 220, the first housing portion 110, and the connecting portion 230. Since the link mechanism 200 includes the four-bar linkage, it is a limited chain, has one degree of freedom, and is easy to control.

Figure 6:
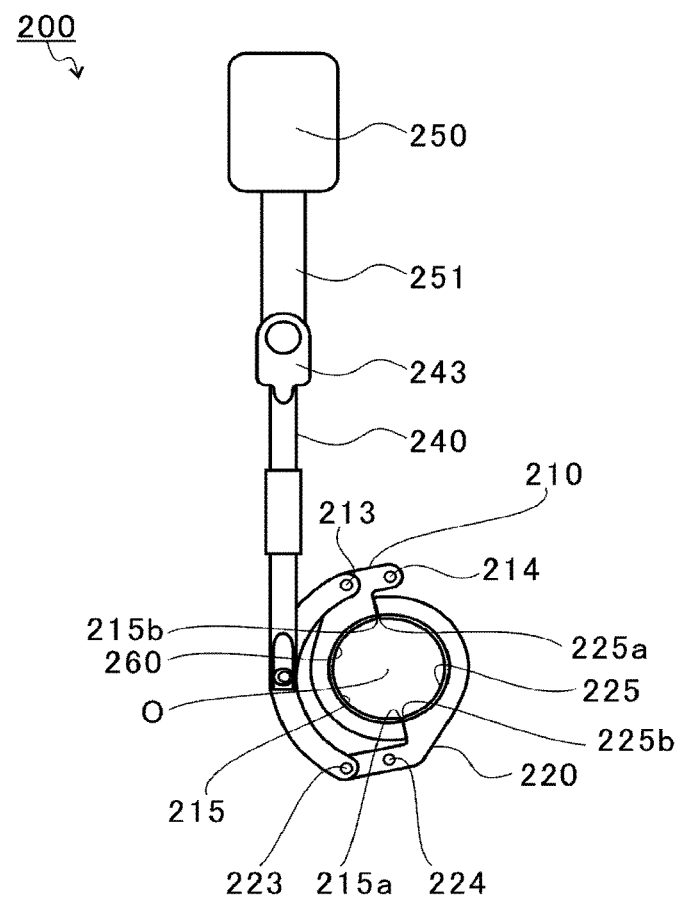
FIG. 6 is a first illustration of an operation of the link mechanism.

FIG. 6 is a first illustration of an operation of the link mechanism 200. In the following FIGS. 6, 7 and 8, the link mechanism 200 is seen from the inlet 10. As shown in FIG. 6, one end of a drive shaft 251 of an actuator 250 is connected to the connecting portion 243 of the rod 240.

In the arrangement shown in FIG. 6, the first movable member 210 and the second movable member 220 are in contact with each other. In this situation, as shown in FIGS. 2 and 5, a protruding portion 215 that is a radially inner part of the first movable member 210 protrudes (is exposed) into the intake flow path 130. A protruding portion 225 that is a radially inner part of the second movable member 220 protrudes (is exposed) into the intake flow path 130. The positions of the first movable member 210 and the second movable member 220 in this situation are referred to as a protruding position (or a throttling position).

As shown in FIG. 6, in the protruding position, ends 215a and 215b of the protruding portion 215 in the circumferential direction and ends 225a and 225b of the protruding portion 225 in the circumferential direction contact each other. The protruding portions 215 and 225 form an annular hole 260. An inner diameter of the annular hole 260 is smaller than the inner diameter of the intake flow path 130 at a position where the protruding portions 215 and 225 protrude. For example, the inner diameter of the annular hole 260 is smaller than the inner diameter of the intake flow path 130 at any positions.

Figure 7:
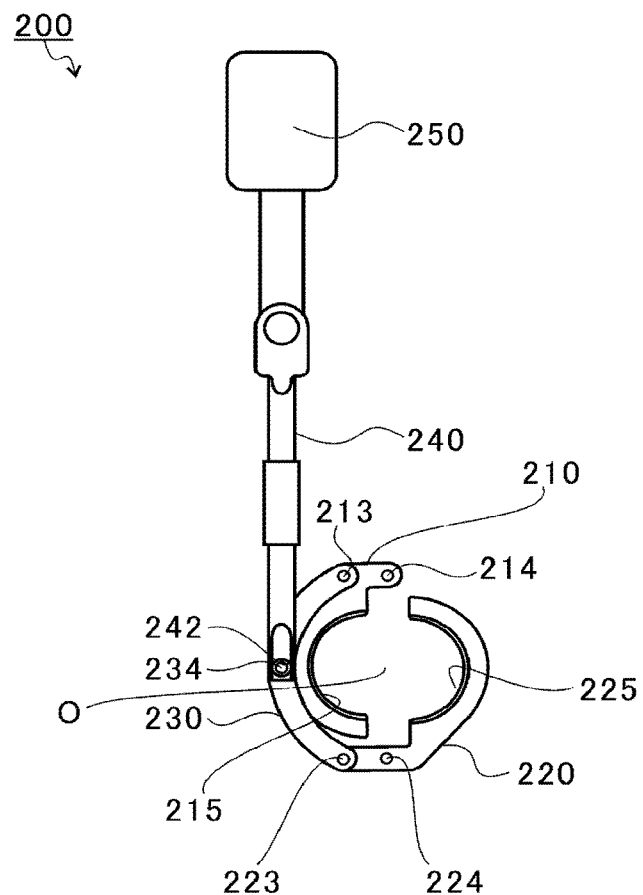
FIG. 7 is a second illustration of the operation of the link mechanism.
Figure 8:
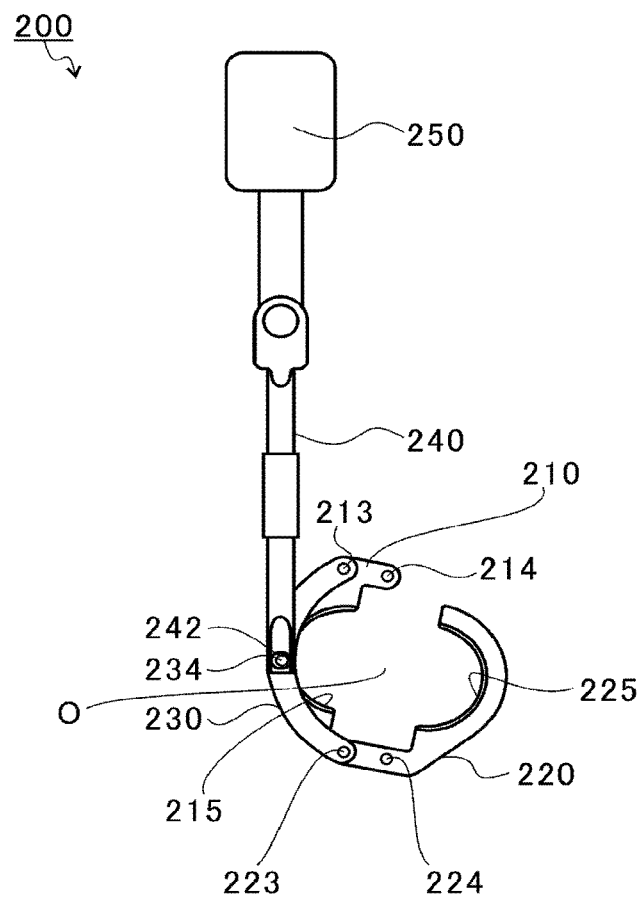
FIG. 8 is a third illustration of the operation of the link mechanism.

FIG. 7 is a second illustration of the operation of the link mechanism 200. FIG. 8 is a third illustration of the operation of the link mechanism 200. The actuator 250 linearly moves the rod 240 in a direction that intersects the rotational axis direction (up-and-down direction in FIGS. 7 and 8). The rod 240 moves upward from the position shown in FIG. 6. With regard to an amount of movement from the arrangement shown in FIG. 6, the arrangement shown in FIG. 8 is larger than the arrangement shown in FIG. 7.

As the rod 240 moves, the connecting member 230 moves upward in FIGS. 7 and 8 via the rod connector 234. In this situation, the connecting member 230 is allowed to rotate around the rod connector 234. Furthermore, there is a slight play between the inner diameter of the bearing hole 242 of the rod 240 and the outer diameter of the rod connector 234. Accordingly, the connecting member 230 is allowed to slightly move in the plane direction perpendicular to the rotational axis direction.

As described above, the link mechanism 200 is the four-bar linkage. The connecting member 230, the first movable member 210, and the second movable member 220 exhibit a behavior of one degree of freedom with respect to the first housing member 110. Specifically, the connecting member 230 slightly moves in the left-to-right direction while slightly rotating counterclockwise in FIGS. 7 and 8 within the allowable range described above.

The rotational shaft 214 of the first movable member 210 is supported by the first housing member 110. The rotational shaft 214 is prevented from moving in the plane direction perpendicular to the rotational axis direction. The connecting shaft 213 is supported by the connecting member 230. Since the connecting member 230 is allowed to move, the connecting shaft 213 is configured to be movable in the plane direction perpendicular to the rotational axis direction. As a result, as the connecting member 230 moves, the first movable member 210 rotates in a clockwise direction in FIGS. 7 and 8 around the rotational shaft 214.

Similarly, the rotational shaft 224 of the second movable member 220 is supported by the first housing member 110. The rotational shaft 224 is prevented from moving in the plane direction perpendicular to the rotational axis direction. The connecting shaft 223 is supported by the connecting member 230. Since the connecting shaft 223 is allowed to move, the connecting shaft 223 is configured to be movable in the plane direction perpendicular to the rotational axis direction. As a result, as the connecting member 230 moves, the second movable member 220 rotates in a clockwise direction in FIGS. 7 and 8 around the rotational shaft 224.

As such, the first movable member 210 and the second movable member 220 move in directions spaced apart from each other in the order of FIG. 7 to FIG. 8. The protruding portions 215 and 225 move to a radially outer side (retracted position) with respect to the protruding position. In the retracted position, for example, the protruding portions 215 and 225 are flush with an inner wall of the intake flow path 130 or are located radially outside the inner wall of the intake flow path 130. When moving from the retracted position to the protruding position, the first movable member 210 and the second movable member 220 approach and contact each other in the order of FIG. 8 to FIG. 6. As such, the first movable member 210 and the second movable member 220 switch between the protruding position and the retracted position according to rotational angles around the rotational shafts 214 and 224.

As described above, the first movable member 210 and the second movable member 220 are movable to the protruding position where they protrude into the intake flow path 130, and a retracted position where they are retracted from the intake flow path 130. In the present embodiment, the first movable member 210 and the second movable member 220 move in the radial direction. However, the first movable member 210 and the second movable member 220 are not limited thereto, and may rotate around the rotational axis (in the circumferential direction) of the compressor impeller 9. For example, the first movable member 210 and the second movable member 220 may be shutter blades having two or more blades.

The first movable member 210 and the second movable member 220 do not protrude into the intake flow path 130 when in the retracted position, thus reducing pressure loss of intake gas (air) flowing in the intake flow path 130.

Furthermore, as shown in FIG. 2, the protruding portions 215 and 225 of the first movable member 210 and the second movable member 220 are arranged in the intake flow path 130 in the protruding position. When the first movable member 210 and the second movable member 220 are in the protruding position, the cross-sectional area of the intake flow path 130 decreases.

As a flow rate of air flowing into the compressor impeller 9 decreases, air compressed by the compressor impeller 9 may flow backward (i.e., the air flows from the downstream side to the upstream side) in the intake flow path 130.

As shown in FIG. 2, when the first movable member 210 and the second movable member 220 are in the protruding position, the protruding portions 215 and 225 are located radially inside with respect to the radially outermost end of the leading edge LE of the long blade 9a of the compressor impeller 9. As a result, the air flowing backward in the intake flow path 130 is blocked by the protruding portions 215 and 225. Accordingly, the first movable member 210 and the second movable member 220 can curb the backflow of air in the intake flow path 130.

In addition, since the cross-sectional area of the intake flow path 130 decreases, velocity of the air flowing into the compressor impeller 9 increases. As a result, occurrence of surging in the centrifugal compressor CC can be curbed. In other words, the centrifugal compressor CC of the present embodiment can expand its operational area to a smaller flow rate area by maintaining the first movable member 210 and the second movable member 220 in the protruding position.

As such, the first movable member 210 and the second movable member 220 are configured as throttles that throttle the intake flow path 130. In other words, in the present embodiment, the link mechanism 200 is configured as a throttling mechanism that throttles the intake flow path 130. The first movable member 210 and the second movable member 220 can change the cross-sectional area of the intake flow path 130 when the link mechanism 200 is driven.

The air flowing backward in the intake flow path 130 includes a swirling flow component caused by the rotation of the compressor impeller 9. When the air flowing backward in the intake flow path 130 is blocked by the movable members 210 and 220, the swirling flow component of the air flowing backward disturbs a flow around the leading edges LE of the long blades 9a of the compressor impeller 9, and noise that may be considered as aerodynamic noise may be generated.

In the present embodiment, the recess 300 is formed closer to the blades 9a and 9b of the compressor impeller 9 with respect to the accommodation chamber AC where the movable members 210 and 220 are located, and the ring 310 is arranged within the recess 300. The ring 310 includes the plurality of compartment walls 320 and the outer circumferential wall 330. Furthermore, the plurality of slits 340 are formed between the plurality of compartment walls 320, and the plurality of slits 340 are connected to the intake flow path 130 at the radially inner parts.

Thus, the air flowing backward in the intake flow path 130 is led into the plurality of slits 340, and impinges on the plurality of compartment walls 320, thereby reducing the swirling flow component. Furthermore, the radially outer ends of the plurality of slits 340 are closed by the outer circumferential wall 330. Accordingly, a flow of air that passes through the plurality of slits 340 and reaches the radially outer ends is blocked by the outer circumferential wall 330, and the swirling flow of air led into the plurality of slits 340 inevitably comes into contact with the plurality of compartment walls 320. This effectively reduces the swirling flow component of the air led into the plurality of slits 340. As a result, noise caused by the swirling flow component of the air flowing backward in the intake flow path 130 is reduced.

The first embodiment describes the example in which the recess 300 is formed in the second housing member 120 and the ring 310 that is separate from the second housing member 120 is arranged within the recess 300. However, the ring 310 is not limited thereto, and may be integrally formed with the second housing member 120. In this case, the plurality of slits 340 communicating with the intake flow path 130 are directly formed on the second housing member 120 so as to be closer to the blades 9a and 9b of the compressor impeller 9 with respect to the accommodation chamber AC. Similarly, the plurality of compartment walls 320 circumferentially separating the plurality of slits 340 and the outer circumferential wall 330 connecting the radially outer ends of the plurality of compartment walls 320 are directly formed on the second housing member 120.

The plurality of compartment walls 320, the outer circumferential wall 330, and the plurality of slits 340 are formed closer to the accommodation chamber AC with respect to the leading edge LE of the long blade 9a of the compressor impeller 9. As such, the swirling flow component of the air blocked by the movable members 210 and 220 is directly reduced in the area upstream of the leading edge LE of the long blade 9a.

In the first embodiment, the partition 302 is provided between the recess 300 and the accommodation chamber AC. By providing the partition 302, the hot air flowing backward in the intake flow path 130 can be prevented from directly flowing into the accommodation chamber AC via the recess 300. This can reduce the heat transferred to the movable members 210 and 220, thereby curbing decrease of the durability of the movable members 210 and 220.

Second Embodiment

Figure 9:
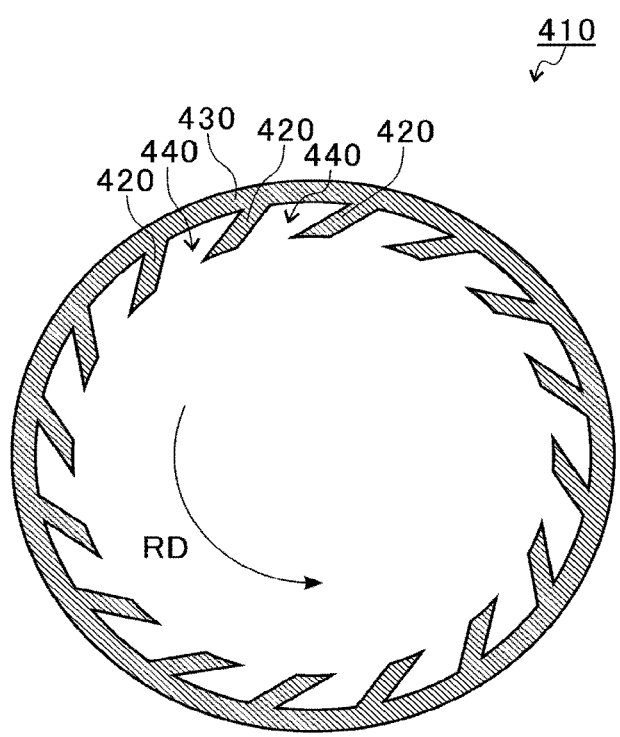
FIG. 9 is a schematic front view of the ring according to the second embodiment.

FIG. 9 is a schematic front view of the ring 410 according to the second embodiment. Components that are substantially equivalent to those of the centrifugal compressor CC of the above embodiment will be assigned with the same reference signs, and descriptions thereof will be omitted. The ring 410 of the second embodiment differs from the ring 310 of the first embodiment in the shape of the plurality of compartment walls 420 and the plurality of slits 440.

As shown in FIG. 9, the ring 410 includes the plurality of compartment walls 420 and the outer circumferential wall 430. The plurality of compartment walls 420 are spaced apart from each other at equal intervals in the circumferential direction. However, the plurality of compartment walls 420 are not limited thereto, and may be spaced apart from each other at unequal intervals in the circumferential direction. The plurality of compartment walls 420 extend in directions inclined with respect to the radial direction, and circumferentially divide the space within the recess 300. As such, the plurality of slits 440 extending in directions inclined with respect to the radial direction are formed between the plurality of compartment walls 420. The plurality of compartment walls 420 circumferentially separate the plurality of slits 440.

The plurality of compartment walls 420 are inclined in a direction opposite to the rotational direction RD of the compressor impeller 9 from a radially inner side to a radially outer side. In other words, the plurality of compartment walls 420 are inclined in the rotational direction RD of the compressor impeller 9 from the radially outer side to the radially inner side. The radially inner parts of the plurality of compartment walls 420 are located advanced with respect to the radially outer parts in the rotational direction RD. The radially outer parts of the plurality of compartment walls 420 are located behind the radially inner parts in the rotational direction RD. A circumferential width of the plurality of compartment walls 420 is constant.

Similarly, the plurality of slits 440 are inclined in the direction opposite to the rotational direction RD of the compressor impeller 9 from the radially inner side to the radially outer side. In other words, the plurality of slits 440 are inclined in the rotational direction RD of the compressor impeller 9 from the radially outer side to the radially inner side. The radially inner parts of the plurality of slits 440 are located advanced with respect to the radially outer parts in the rotational direction RD. The radially outer parts of the plurality of slits 440 are located behind the radially inner parts in the rotational direction RD. With regard to an inclination angle of the compartment walls 420, the direction opposite to the rotational direction RD of the compressor impeller 9 is defined as a positive direction. In this case, the inclination angle of the plurality of compartment walls 420 with respect to the radial direction is set within a range of 20° to 70°, for example. In FIG. 9, the inclination angle of the compartment walls 420 with respect to the radial direction is 60°.

The outer circumferential wall 430 connects the radially outer ends of the plurality of compartment walls 420. As such, the radially outer parts of the plurality of slits 440 are defined by the outer circumferential wall 430. Thus, the plurality of slits 440 are separated by the plurality of compartment walls 420 in the circumferential direction, and defined by the outer circumferential wall 430 in the radially outer parts. The radially inner parts of the plurality of slits 440 are connected to the intake flow path 130.

Figure 10:
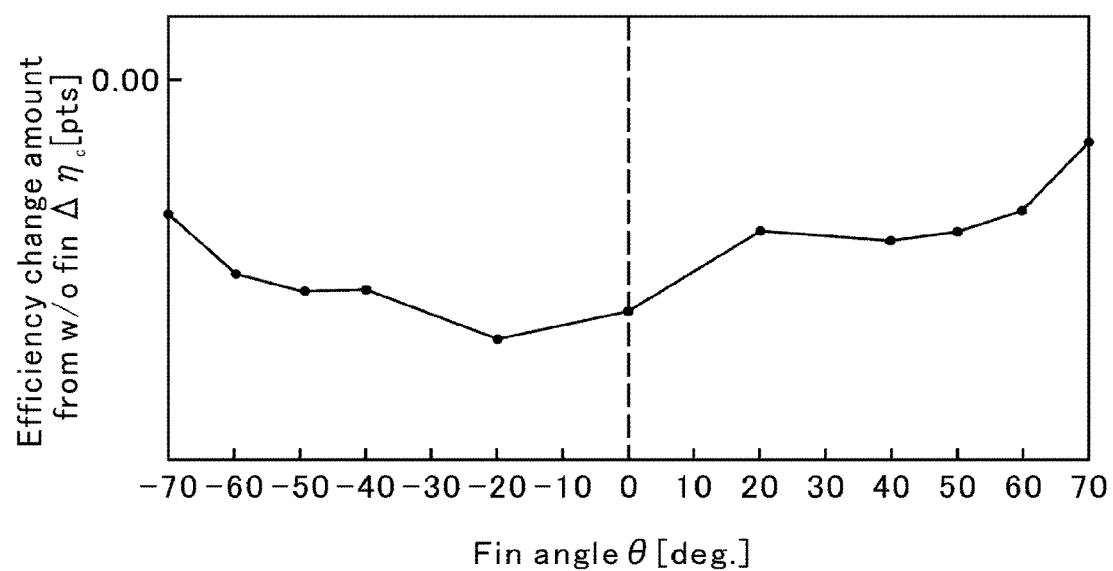
FIG. 10 is an illustration of a relationship between an inclination angle of a compartment wall and compressor efficiency.

FIG. 10 is an illustration of a relationship between the inclination angle of the compartment walls 420 and compressor efficiency. In FIG. 10, the vertical axis represents the amount of change in the compressor efficiency with respect to the case without fins (compartment walls), and the horizontal axis represents the inclination angle of the compartment walls 420. With regard to the inclination angle of the compartment walls 420 on the horizontal axis, the direction of inclination from the radially inner side to the radially outer side that is opposite to the rotational direction RD of the compressor impeller 9 is defined as a positive direction. As shown in FIG. 10, when the absolute values of the inclination angles of the compartment walls 420 are the same, the positive inclination angle can curb the decrease in the compressor efficiency more, compared to the negative inclination angle. As the absolute value of the inclination angle of the compartment walls 420 increases, the decrease in the compressor efficiency can be curbed. However, an increase in the absolute value of the inclination angle of the compartment walls 420 makes it more difficult to form the compartment walls 420. Accordingly, the maximum value of the inclination angle of the compartment walls 420 is set at "70." When the inclination angle of the compartment walls 420 is set in the range of 20° to 70°, the pressure loss can be reduced and the decrease in the compressor efficiency can be curbed, compared to the case where, for example, the compartment walls 420 are extended in the radial direction (0°).

According to the second embodiment, the compressor efficiency can be improved, compared to the first embodiment.

Third Embodiment

Figure 11:
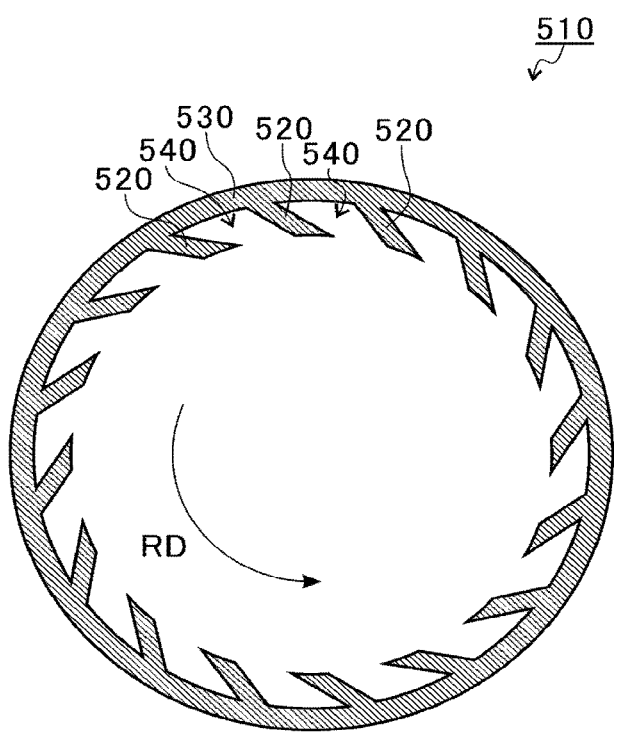
FIG. 11 is a schematic front view of the ring according to the third embodiment.

FIG. 11 is a schematic front view of the ring 510 according to the third embodiment. Components that are substantially equivalent to those of the centrifugal compressor CC of the above embodiment will be assigned with the same reference signs, and descriptions thereof will be omitted. The ring 510 of the third embodiment differs from the ring 310 of the first embodiment and the ring 410 of the second embodiment in the shape of the plurality of compartment walls 520 and the plurality of slits 540.

As shown in FIG. 11, the ring 510 includes the plurality of compartment walls 520 and the outer circumferential wall 530. The plurality of compartment walls 520 are spaced apart from each other at equal intervals in the circumferential direction. However, the plurality of compartment walls 520 are not limited thereto, and may be spaced apart from each other at unequal intervals in the circumferential direction. The plurality of compartment walls 520 extend in directions inclined with respect to the radial direction, and circumferentially divide the space within the recess 300. As such, the plurality of slits 540 extending in directions inclined with respect to the radial direction are formed between the plurality of compartment walls 520. The plurality of compartment walls 520 circumferentially separate the plurality of slits 540.

The plurality of compartment walls 520 are inclined in the rotational direction RD of the compressor impeller 9 from the radially inner side to the radially outer side. In other words, the plurality of compartment walls 520 are inclined in the direction opposite to the rotational direction RD of the compressor impeller 9 from the radially outer side to the radially inner side. The radially inner parts of the plurality of compartment walls 520 are located behind the radially outer parts in the rotational direction RD. The radially outer parts of the plurality of compartment walls 520 are located advanced with respect to the radially inner parts in the rotational direction RD. The circumferential width of the plurality of compartment walls 520 is constant.

Similarly, the plurality of slits 540 are inclined in the rotational direction RD of the compressor impeller 9 from the radially inner side to the radially outer side. In other words, the plurality of slits 540 are inclined in the direction opposite to the rotational direction RD of the compressor impeller 9 from the radially outer side to the radially inner side. The radially inner parts of the plurality of slits 540 are located behind the radially outer parts in the rotational direction RD. The radially outer parts of the plurality of slits 540 are located advanced with respect to the radially inner parts in the rotational direction RD. With regard to the inclination angle of the compartment walls 520, the direction inclined from the radially inner side to the radially outer side in the rotational direction RD of the compressor impeller 9 is defined as a negative direction. In this case, the inclination angle of the plurality of compartment walls 520 with respect to the radial direction is set within a range of −20° to −70°, for example. In FIG. 11, the inclination angle of the compartment walls 520 with respect to the radial direction is −60°.

When the inclination angle of the compartment walls 520 is in the range of −20° to −30°, the swirl component of the air can be curbed, although the compressor efficiency is reduced compared to the case where, for example, the compartment walls extend in the radial direction (0°), as shown in FIG. 10. As a result, the noise reduction effect can be improved, compared to the first embodiment. Furthermore, when the inclination angle of the compartment walls 520 is in the range of −30° to −70°, the reduction in the compressor efficiency can be curbed while maintaining the same noise reduction effect as when the inclination angle is in the range of −20° to −30°.

The outer circumferential wall 530 connects the radially outer ends of the plurality of compartment walls 520. As such, the radially outer parts of the plurality of slits 540 are defined by the outer circumferential wall 530. Thus, the plurality of slits 540 are separated by the plurality of compartment walls 520 in the circumferential direction, and defined by the outer circumferential wall 530 in the radially outer parts. The radially inner parts of the plurality of slits 540 are connected to the intake flow path 130.

According to the third embodiment, since the plurality of compartment walls 520 are inclined in the rotational direction RD of the compressor impeller 9, the air flowing into the plurality of slits 540 is difficult to be discharged from the plurality of slits 540 into the intake flow path 130. As such, compared to the first embodiment in which the plurality of slits 340 extend in the radial direction and the second embodiment in which the plurality of slits 440 are inclined in the direction opposite to the rotational direction RD, the swirl component of the air flowing backward can be reduced. As a result, the noise reduction effect can be improved and the noise level can be reduced compared to the first and second embodiments.

Fourth Embodiment

Figure 12:
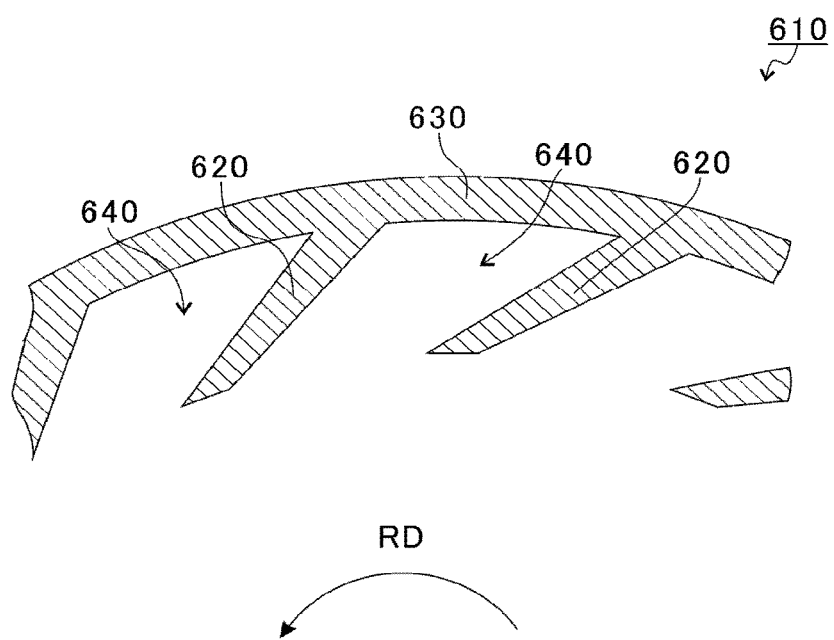
FIG. 12 is a schematic front view of the ring according to the fourth embodiment.

FIG. 12 is a schematic front view of the ring 610 according to the fourth embodiment. Components that are substantially equivalent to those of the centrifugal compressor CC of the above embodiment will be assigned with the same reference signs, and descriptions thereof will be omitted. The ring 610 of the fourth embodiment differs from the ring 410 of the second embodiment in the shape of the plurality of compartment walls 620 and the plurality of slits 640.

As shown in FIG. 12, the ring 610 includes the plurality of compartment walls 620 and the outer circumferential wall 630. The plurality of compartment walls 620 are spaced apart from each other at equal intervals in the circumferential direction. However, the plurality of compartment walls 620 are not limited thereto, and may be spaced apart from each other at unequal intervals in the circumferential direction. The plurality of compartment walls 620 extend in directions inclined with respect to the radial direction, and circumferentially divide the space within the recess 300. As such, the plurality of slits 640 extending in directions inclined with respect to the radial direction are formed between the plurality of compartment walls 620. The plurality of compartment walls 620 circumferentially separate the plurality of slits 640.

The plurality of compartment walls 620 are inclined in the direction opposite to the rotational direction RD of the compressor impeller 9 from the radially inner side to the radially outer side. In other words, the plurality of compartment walls 620 are inclined in the rotational direction RD of the compressor impeller 9 from the radially outer side to the radially inner side. The radially inner parts of the plurality of compartment walls 620 are located advanced with respect to the radially outer parts in the rotational direction RD. The radially outer parts of the plurality of compartment walls 620 are located behind the radially inner parts in the rotational direction RD.

Furthermore, the circumferential width of the plurality of compartment walls 620 on the radially outer side is larger than that of on the radially inner side. In other words, the circumferential width of the plurality of compartment walls 620 on the radially inner side is smaller than that of on the radially outer side. Specifically, the circumferential width of the plurality of compartment walls 620 increases as moving to the radially outer side. In other words, the circumferential width of the plurality of compartment walls 620 decreases as moving to the radially inner side.

Similarly, the plurality of slits 640 are inclined in the direction opposite to the rotational direction RD of the compressor impeller 9 from the radially inner side to the radially outer side. In other words, the plurality of slits 640 are inclined in the rotational direction RD of the compressor impeller 9 from the radially outer side to the radially inner side. The radially inner parts of the plurality of slits 640 are located advanced with respect to the radially outer parts in the rotational direction RD. The radially outer parts of the plurality of slits 640 are located behind the radially inner parts in the rotational direction RD. The inclination angle of the plurality of compartment walls 620 with respect to the radial direction is set within a range of 20° to 70°, for example. In FIG. 12, the inclination angle of the compartment walls 620 is 60°.

The outer circumferential wall 630 connects the radially outer ends of the plurality of compartment walls 620. As such, the radially outer parts of the plurality of slits 640 are defined by the outer circumferential wall 630. Thus, the plurality of slits 640 are separated by the plurality of compartment walls 620 in the circumferential direction, and defined by the outer circumferential wall 630 in the radially outer parts. The radially inner parts of the plurality of slits 640 are connected to the intake flow path 130.

Figure 13:
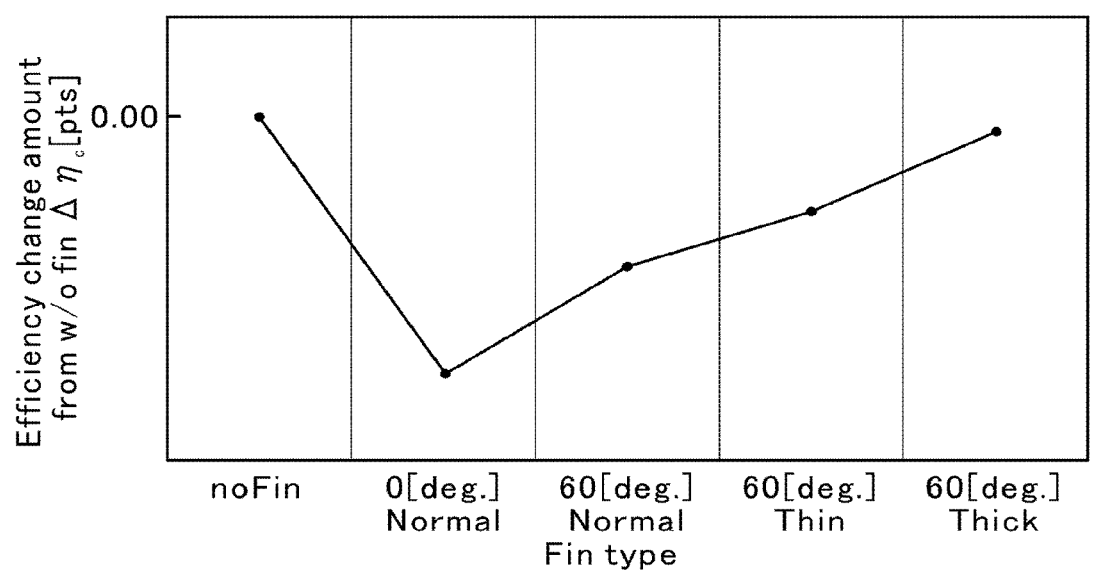
FIG. 13 is an illustration of a relationship between a type of the compartment wall and compressor efficiency.

FIG. 13 is an illustration of a relationship between a type of the compartment wall 620 and compressor efficiency. In FIG. 13, the case where the compartment walls 320 of the above first embodiment are not formed is represented by "noFin", and the case where the compartment walls 320 of the above first embodiment are formed is represented by "0 [deg.] Normal". Furthermore, the case where the compartment walls 420 of the above second embodiment are formed is represented by "60 [deg.] Normal," and the case where the compartment walls 620 of the fourth embodiment are formed is represented by "60 [deg.] Thin." As shown in FIG. 13, the compartment wall 620 of the fourth embodiment can curb the decrease in the compressor efficiency, compared to the cases where the compartment wall 320 of the first embodiment and the compartment wall 420 of the second embodiment are formed. This is because the circumferential width of the radially inner ends is smaller than that of the compartment walls 320 of the first embodiment and that of the compartment walls 420 of the second embodiment, thereby achieving a reduction in wall friction loss at the radially inner ends and a reduction in mixing loss with the mainstream.

According to the fourth embodiment, the circumferential width of the radially inner ends of the compartment wall 620s is smaller than that in the second embodiment, thereby improving compressor efficiency compared to the second embodiment.

Fifth Embodiment

Figure 14:
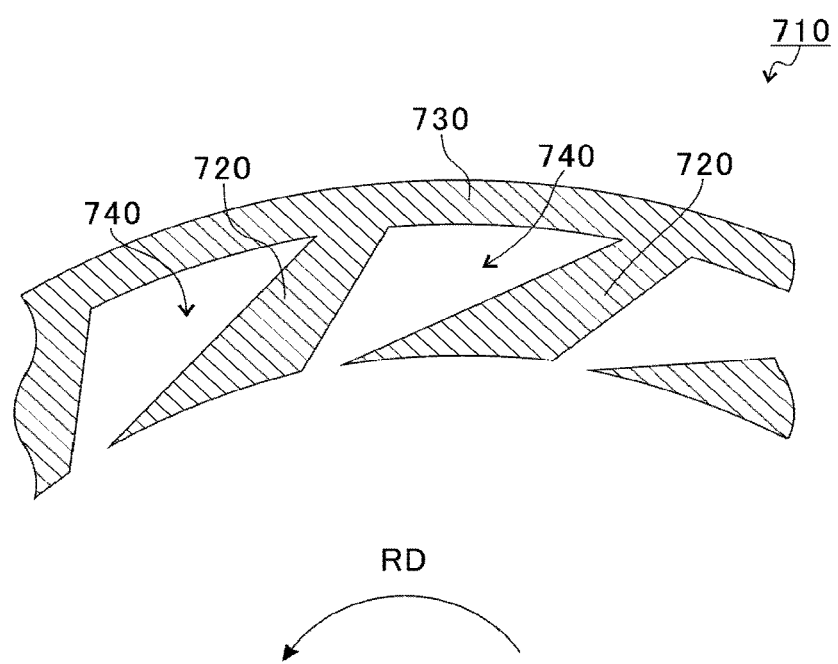
FIG. 14 is a schematic front view of the ring according to the fifth embodiment.

FIG. 14 is a schematic front view of the ring 710 according to the fifth embodiment. Components that are substantially equivalent to those of the centrifugal compressor CC of the above embodiment will be assigned with the same reference signs, and descriptions thereof will be omitted. The ring 710 of the fifth embodiment differs from the ring 410 of the second embodiment in the shape of the plurality of compartment walls 720 and the plurality of slits 740.

As shown in FIG. 14, the ring 710 includes the plurality of compartment walls 720 and the outer circumferential wall 730. The plurality of compartment walls 720 are spaced apart from each other at equal intervals in the circumferential direction. However, the plurality of compartment walls 720 are not limited thereto, and may be spaced apart from each other at unequal intervals in the circumferential direction. The plurality of compartment walls 720 extend in directions inclined with respect to the radial direction, and circumferentially divide the space within the recess 300. As such, the plurality of slits 740 extending in directions inclined with respect to the radial direction are formed between the plurality of compartment walls 720. The plurality of compartment walls 720 circumferentially separate the plurality of slits 740.

The plurality of compartment walls 720 are inclined in the direction opposite to the rotational direction RD of the compressor impeller 9 from the radially inner side to the radially outer side. In other words, the plurality of compartment walls 720 are inclined in the rotational direction RD of the compressor impeller 9 from the radially outer side to the radially inner side. The radially inner parts of the plurality of compartment walls 720 are located advanced with respect to the radially outer parts in the rotational direction RD. The radially outer parts of the plurality of compartment walls 720 are located behind the radially inner parts in the rotational direction RD.

Furthermore, the circumferential width of the plurality of compartment walls 720 on the radially inner side is greater than that on the radially outer side. In other words, the circumferential width of the plurality of compartment walls 720 on the radially outer side is smaller than that on the radially inner side. Specifically, the circumferential width of the plurality of compartment walls 720 increases as moving to the radially inner side. In other words, the circumferential width of the plurality of compartment walls 720 decreases as moving to the radially outer side.

Similarly, the plurality of slits 740 are inclined in the direction opposite to the rotational direction RD of the compressor impeller 9 from the radially inner side to the radially outer side. In other words, the plurality of slits 740 are inclined in the rotational direction RD of the compressor impeller 9 from the radially outer side to the radially inner side. The radially inner parts of the plurality of slits 740 are located advanced with respect to the radially outer parts in the rotational direction RD. The radially outer parts of the plurality of slits 740 are located behind the radially inner parts in the rotational direction RD. The inclination angle of the plurality of compartment walls 720 with respect to the radial direction is set within a range of 20° to 70°, for example. In FIG. 14, the inclination angle of the compartment walls 720 is 60°.

The outer circumferential wall 730 connects the radially outer ends of the plurality of compartment walls 720. As such, the radially outer parts of the plurality of slits 740 are defined by the outer circumferential wall 730. Thus, the plurality of slits 740 are separated by the plurality of compartment walls 720 in the circumferential direction, and defined by the outer circumferential wall 730 in the radially outer parts. The radially inner parts of the plurality of slits 740 are connected to the intake flow path 130.

In FIG. 13, the case where the compartment walls 720 of the fifth embodiment are formed is represented by "60 [deg.] Thick." As shown in FIG. 13, the compartment walls 720 of the fifth embodiment can curb the decrease in the compressor efficiency, compared to the compartment walls 320 of the first embodiment, the compartment walls 420 of the second embodiment, and the compartment walls 620 of the fourth embodiment. This is because the circumferential width of the radially inner ends is larger than that of the compartment walls 320 of the first embodiment, that of the compartment walls 420 of the second embodiment, and that of the compartment walls 620 of the fourth embodiment, thereby reducing the amount of air impinging on the compartment walls 720.

According to the fifth embodiment, the compressor efficiency can be improved compared to the first, second, and fourth embodiments.

Although the embodiments of the present disclosure have been described above with reference to the accompanying drawings, the present disclosure is not limited thereto. It is obvious that a person skilled in the art can conceive of various examples of variations or modifications within the scope of the claims, which are also understood to belong to the technical scope of the present disclosure.

In the above second through fifth embodiments, examples of setting the inclination angle of the plurality of compartment walls 420, 520, 620 and 720 in the range of 20° to 70° or −20° to −70° are described. However, the inclination angle of the plurality of compartment walls 420, 520, 620 and 720 are not limited thereto, and may be outside the range of 20° to 70° or −20° to −70°.

What is claimed is:

1. A centrifugal compressor comprising:
    a housing including an intake flow path;
    a compressor impeller arranged in the intake flow path and including a plurality of blades;
    an accommodation chamber formed upstream of the plurality of blades in a flow of intake air in the housing;
    a movable member arranged in the accommodation chamber and movable to a protruding position where the movable member protrudes into the intake flow path and to a retracted position where the movable member is retracted from the intake flow path;
    a plurality of slits formed closer to the plurality of blades with respect to the accommodation chamber in the housing and connected to the intake flow path;
    a plurality of compartment walls circumferentially separating the plurality of slits; and
    an outer circumferential wall connecting radially outer ends of the plurality of compartment walls.

2. The centrifugal compressor according to claim 1, wherein the plurality of compartment walls are arranged closer to the accommodation chamber with respect to leading edges of the plurality of blades.

3. The centrifugal compressor according to claim 2, wherein the plurality of compartment walls are inclined in a rotational direction of the compressor impeller.

4. The centrifugal compressor according to claim 3, wherein an inclination angle of the plurality of compartment walls is in a range of 20° to 70° or −20° to −70° with respect to a radial direction of the compressor impeller.

5. The centrifugal compressor according to claim 1, wherein the plurality of compartment walls are inclined in a rotational direction of the compressor impeller.

6. The centrifugal compressor according to claim 5, wherein an inclination angle of the plurality of compartment walls is in a range of 20° to 70° or −20° to −70° with respect to a radial direction of the compressor impeller.

7. A turbocharger comprising the centrifugal compressor according to claim 1.

* * * * *